(12) United States Patent
Weight et al.

(10) Patent No.: US 10,592,598 B1
(45) Date of Patent: Mar. 17, 2020

(54) BOOK VERSION MAPPING

(71) Applicant: Amazon Technologies, Inc., Seattle, WA (US)

(72) Inventors: Christopher F. Weight, Seattle, WA (US); Janna Hamaker, Seattle, WA (US); Tom Killalea, Seattle, WA (US); Bruno A. Posokhow, Menlo Park, CA (US); Daniel B. Rausch, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 44 days.

(21) Appl. No.: 15/810,510

(22) Filed: Nov. 13, 2017

Related U.S. Application Data

(63) Continuation of application No. 12/980,015, filed on Dec. 28, 2010, now Pat. No. 9,846,688.

(51) Int. Cl.
G06F 17/24 (2006.01)
G06F 17/21 (2006.01)

(52) U.S. Cl.
CPC .......... *G06F 17/241* (2013.01); *G06F 17/211* (2013.01)

(58) Field of Classification Search
CPC ............... G06F 17/241; G06F 17/2264; G06F 17/2288; G06F 17/218; G06F 17/2211
See application file for complete search history.

(56) References Cited

U.S. PATENT DOCUMENTS

| | | | |
|---|---|---|---|
| 4,884,974 A | 12/1989 | DeSmet | |
| 5,166,664 A | 11/1992 | Fish | |
| 5,802,204 A | 9/1998 | Basehore | |
| 5,907,845 A | 5/1999 | Cox et al. | |
| 5,960,464 A | 9/1999 | Lam | |
| 5,986,690 A | 11/1999 | Hendricks | |
| 6,047,093 A | 4/2000 | Lopresti et al. | |
| 6,074,093 A | 6/2000 | Anderson | |
| 6,108,688 A | 8/2000 | Nielsen | |
| 6,138,129 A | 10/2000 | Combs | |
| 6,173,251 B1 | 1/2001 | Ito et al. | |
| 6,218,982 B1 | 4/2001 | Shirai et al. | |
| 6,377,945 B1 | 4/2002 | Risvik | |
| 6,480,838 B1 | 11/2002 | Peterman | |
| 6,622,624 B1 | 9/2003 | Divine et al. | |
| 6,658,626 B1 | 12/2003 | Aiken | |

(Continued)

FOREIGN PATENT DOCUMENTS

JP 2009205248 9/2009

OTHER PUBLICATIONS

"How do I use the Migrate Comments Command?", The Same Page, Retrieved Feb. 17, 2017 from http://blogs.adobe.com/thesamepage/2009/05/how_do_i_use_the_migrate_comme.html, 2 pgs.

(Continued)

*Primary Examiner* — Scott T Baderman
*Assistant Examiner* — Seung Woon Jung
(74) *Attorney, Agent, or Firm* — Lee & Hayes, P.C.

(57) ABSTRACT

Techniques for use with electronic book readers include coordinating or translating position information between different versions of an electronic book. Positions within different versions can be translated for various purposes, such as transferring annotations between versions or synchronizing positions within different versions.

20 Claims, 7 Drawing Sheets

(56) References Cited

U.S. PATENT DOCUMENTS

| | | |
|---|---|---|
| 6,704,733 B2 | 3/2004 | Clark et al. |
| 6,741,985 B2 | 5/2004 | Green |
| 6,898,307 B1 | 5/2005 | Harrington |
| 7,020,654 B1 | 3/2006 | Najmi |
| 7,020,663 B2 | 3/2006 | Hay et al. |
| 7,028,258 B1 | 4/2006 | Thacker et al. |
| 7,350,143 B2 | 3/2008 | Elazar et al. |
| 7,702,655 B1 | 4/2010 | Panelli et al. |
| 7,823,127 B2 | 10/2010 | Zeidman |
| 8,051,088 B1 | 11/2011 | Tibbetts et al. |
| 8,149,217 B2 | 4/2012 | Yeung et al. |
| 8,229,912 B2 | 7/2012 | Downum et al. |
| 8,250,065 B1 | 8/2012 | Chambers et al. |
| 8,266,115 B1 | 9/2012 | Park et al. |
| 8,280,640 B2 | 10/2012 | Levin et al. |
| 8,316,032 B1 | 11/2012 | Baluja et al. |
| 8,463,790 B1 | 6/2013 | Joshi et al. |
| 8,495,061 B1 | 7/2013 | Lifantsev |
| 8,510,312 B1 | 8/2013 | Thibaux et al. |
| 8,798,366 B1 | 8/2014 | Jones et al. |
| 9,049,398 B1 | 6/2015 | Moscovich et al. |
| 9,058,067 B2 | 6/2015 | Van Schaack et al. |
| 9,286,392 B2 | 3/2016 | Downum et al. |
| 9,690,758 B2 | 6/2017 | Pyo |
| 2002/0021838 A1 | 2/2002 | Richardson et al. |
| 2002/0049781 A1 | 4/2002 | Bengtson |
| 2002/0091584 A1 | 7/2002 | Clark et al. |
| 2002/0107735 A1 | 8/2002 | Henkin et al. |
| 2002/0123994 A1 | 9/2002 | Schabes et al. |
| 2003/0032010 A1 | 2/2003 | Selifonov et al. |
| 2003/0093427 A1 | 5/2003 | Hsu et al. |
| 2003/0103238 A1 | 6/2003 | MacLean et al. |
| 2003/0130994 A1 | 7/2003 | Singh et al. |
| 2004/0068471 A1 | 4/2004 | Kato |
| 2004/0088165 A1 | 5/2004 | Okutani et al. |
| 2004/0090390 A1 | 5/2004 | Mason et al. |
| 2004/0194021 A1* | 9/2004 | Marshall ............... G06F 17/241 715/232 |
| 2004/0205540 A1 | 10/2004 | Vulpe et al. |
| 2004/0218205 A1 | 11/2004 | Irwin et al. |
| 2005/0060273 A1 | 3/2005 | Andersen et al. |
| 2005/0096938 A1 | 5/2005 | Slomkowski et al. |
| 2005/0097007 A1 | 5/2005 | Alger et al. |
| 2005/0131932 A1 | 6/2005 | Weare |
| 2005/0138551 A1 | 6/2005 | Elazar et al. |
| 2005/0160355 A1* | 7/2005 | Cragun ................ G06F 17/241 715/230 |
| 2005/0160356 A1 | 7/2005 | Albornoz et al. |
| 2005/0190397 A1 | 9/2005 | Ferlitsch |
| 2005/0192955 A1 | 9/2005 | Farrell |
| 2005/0196074 A1 | 9/2005 | Deere |
| 2005/0198070 A1 | 9/2005 | Lowry |
| 2005/0209989 A1 | 9/2005 | Albornoz et al. |
| 2006/0036593 A1 | 2/2006 | Dean et al. |
| 2006/0036934 A1 | 2/2006 | Fujiwara |
| 2006/0041590 A1 | 2/2006 | King et al. |
| 2006/0064435 A1 | 3/2006 | Firstbrook et al. |
| 2006/0150096 A1 | 7/2006 | Thacker et al. |
| 2006/0156226 A1 | 7/2006 | Dejean et al. |
| 2006/0173818 A1 | 8/2006 | Berstis et al. |
| 2006/0262340 A1 | 11/2006 | Lee |
| 2006/0277167 A1 | 12/2006 | Gross et al. |
| 2006/0294094 A1 | 12/2006 | King et al. |
| 2007/0061582 A1 | 3/2007 | Ohmori et al. |
| 2007/0061755 A1 | 3/2007 | Taboada et al. |
| 2007/0150443 A1* | 6/2007 | Bergholz ............ G06F 16/258 |
| 2007/0180381 A1 | 8/2007 | Rice et al. |
| 2007/0196015 A1 | 8/2007 | Meunier et al. |
| 2007/0217692 A1 | 9/2007 | Newcomer et al. |
| 2007/0217715 A1 | 9/2007 | Newcomer et al. |
| 2007/0274704 A1 | 11/2007 | Nakajima et al. |
| 2007/0280072 A1 | 12/2007 | Hsieh et al. |
| 2007/0286465 A1 | 12/2007 | Takahashi et al. |
| 2008/0019430 A1 | 1/2008 | Suzuki et al. |
| 2008/0021880 A1 | 1/2008 | Ren et al. |
| 2008/0027916 A1 | 1/2008 | Asai et al. |
| 2008/0077570 A1 | 3/2008 | Tang et al. |
| 2008/0114757 A1 | 5/2008 | Dejean et al. |
| 2008/0126335 A1 | 5/2008 | Gandhi et al. |
| 2008/0134023 A1 | 6/2008 | Aizawa |
| 2008/0141117 A1 | 6/2008 | King et al. |
| 2008/0154943 A1 | 6/2008 | Dreyer et al. |
| 2008/0163039 A1 | 7/2008 | Ryan et al. |
| 2008/0209314 A1 | 8/2008 | Sylthe et al. |
| 2008/0229182 A1 | 9/2008 | Hendricks et al. |
| 2008/0235579 A1 | 9/2008 | Champion et al. |
| 2008/0243842 A1 | 10/2008 | Liang et al. |
| 2008/0275871 A1 | 11/2008 | Berstis et al. |
| 2008/0279416 A1 | 11/2008 | Lo et al. |
| 2008/0294453 A1 | 11/2008 | Baird-Smith et al. |
| 2009/0012984 A1 | 1/2009 | Ravid et al. |
| 2009/0027419 A1 | 1/2009 | Kondo et al. |
| 2009/0049026 A1 | 2/2009 | Ohguro |
| 2009/0063557 A1 | 3/2009 | MacPherson |
| 2009/0144277 A1 | 6/2009 | Trutner et al. |
| 2009/0164312 A1 | 6/2009 | Nadig |
| 2009/0182728 A1 | 7/2009 | Anderson |
| 2009/0204893 A1 | 8/2009 | Nguyen et al. |
| 2009/0241054 A1 | 9/2009 | Hendricks |
| 2009/0254810 A1 | 10/2009 | Mitsui |
| 2009/0265321 A1 | 10/2009 | Grubb et al. |
| 2009/0267923 A1 | 10/2009 | Van Schaack et al. |
| 2009/0310408 A1 | 12/2009 | Lee et al. |
| 2009/0313539 A1 | 12/2009 | Ota et al. |
| 2009/0324096 A1 | 12/2009 | Megawa |
| 2010/0088584 A1 | 4/2010 | Pangrazio, III et al. |
| 2010/0114827 A1 | 5/2010 | Pearce |
| 2010/0166309 A1* | 7/2010 | Hull .................... G06F 21/78 382/176 |
| 2010/0198864 A1 | 8/2010 | Ravid et al. |
| 2010/0205160 A1 | 8/2010 | Kumar et al. |
| 2010/0220216 A1 | 9/2010 | Fishman et al. |
| 2010/0251089 A1 | 9/2010 | Cole et al. |
| 2010/0262454 A1 | 10/2010 | Sommer et al. |
| 2010/0287150 A1 | 11/2010 | Downum et al. |
| 2011/0029491 A1 | 2/2011 | Joshi et al. |
| 2011/0078152 A1 | 3/2011 | Forman et al. |
| 2011/0119240 A1 | 5/2011 | Shapira |
| 2011/0153330 A1* | 6/2011 | Yazdani ................ G10L 13/00 704/260 |
| 2011/0173445 A1 | 7/2011 | Yami et al. |
| 2011/0231474 A1 | 9/2011 | Locker et al. |
| 2012/0036431 A1 | 2/2012 | Ito et al. |
| 2012/0060082 A1 | 3/2012 | Edala et al. |
| 2012/0121195 A1 | 5/2012 | Yadid et al. |
| 2012/0198330 A1 | 8/2012 | Koppel et al. |
| 2012/0284250 A1 | 11/2012 | Downum et al. |
| 2014/0298167 A1 | 10/2014 | Jones et al. |

OTHER PUBLICATIONS

Office action for U.S. Appl. No. 13/048,426, dated Jan. 14, 2016, Weight et al., "Identifying Book Title Sets", 26 pages.

Office action for U.S. Appl. No. 12/980,015, dated Jan. 21, 2016, Weight et al., "Book Version Mapping", 40 pages.

Office action for U.S. Appl. No. 12/980,015, dated Nov. 17, 2016, Weight et al., "Book Version Mapping", 27 pages.

Office action for U.S. Appl. No. 13/048,426, dated Nov. 18, 2013, Weight, et al., "Identifying Book Title Sets", 18 pages.

Office action for U.S. Appl. No. 13/050,829, dated Nov. 29, 2012, Hamaker et al.,"Aligning Content Items to Identify Differences", 24 pages.

Office Action for U.S. Appl. No. 12/979,971, dated Dec. 6, 2013, Derek T. Jones, "Electronic Book Pagination", 13 pages.

Office Action for U.S. Appl. No. 14/308,914 dated Mar. 6, 2017, Jones et al, "Electronic Book Pagination", 18 pages.

Office action for U.S. Appl. No. 13/048,426, dated Mar. 7, 2017, Weight et al., "Identifying Book Title Sets", 7 pages.

Office action for U.S. Appl. No. 13/048,426, dated Apr. 1, 2013, Weight et al., "Identifying Book Title Sets", 23 pages.

Office action for U.S. Appl. No. 12/979,971, dated Apr. 18, 2013, Jones et al., "Electronic Book Pagination", 30 pages.

(56) References Cited

OTHER PUBLICATIONS

Final Office Action for U.S. Appl. No. 12/980,015, dated May 19, 2017, Christopher F. Weight, "Book Version Mapping", 30 pages.
Non-Final Office Action for U.S. Appl. No. 13/050,829, dated May 8, 2012, Janna Hamaker et al., "Aligning Content Items to Identify Differences", 20 pages.
Final Office Action for U.S. Appl. No. 12/980,015, dated May 9, 2014, Christopher F. Weight, "Book Version Mapping", 30 pages.
Office action for U.S. Appl. No. 13/048,426, dated Jun. 19, 2014, Weight et al., "Identifying Book Title Sets", 23 pages.
Office Action for U.S. Appl. No. 14/308,914 dated Jul. 14, 2017, Jones et al, "Electronic Book Pagination", 22 pages.
Office Action for U.S. Appl. No. 12/980,015, dated Jul. 7, 2015, Christopher F. Weight, "Book Version Mapping", 32 pages.
Office action for U.S. Appl. No. 12/979,971, dated Aug. 8, 2013, Jones et al., "Electronic Book Pagination", 32 pages.
Office action for U.S. Appl. No. 12/980,015, dated Sep. 10, 2013, Weight et al., "Book Version Mapping", 27 pages.
Office action for U.S. Appl. No. 13/050,829, dated Sep. 30, 2014, Hamaker et al., "Aligning Content Items to Identify Differences", 30 pages.
Office action for U.S. Appl. No. 13/048,426, dated Sep. 8, 2016, Weight et al., "Identifying Book Title Sets", 8 pages.
Wikipedia, "Lookuptable", at http://en.wikipedia.org/w/index.php?title=Lookup_table&oldid_333018082, retrieved on Aug. 2, 2013, 2009, 7 pages.
Wikipedia, "Metadata", at http://en.wikipedia.org/w/index.php?title=Metadata&oldid=333583065, retrieved on Aug. 2, 2013, 2009, 17 pages.

\* cited by examiner

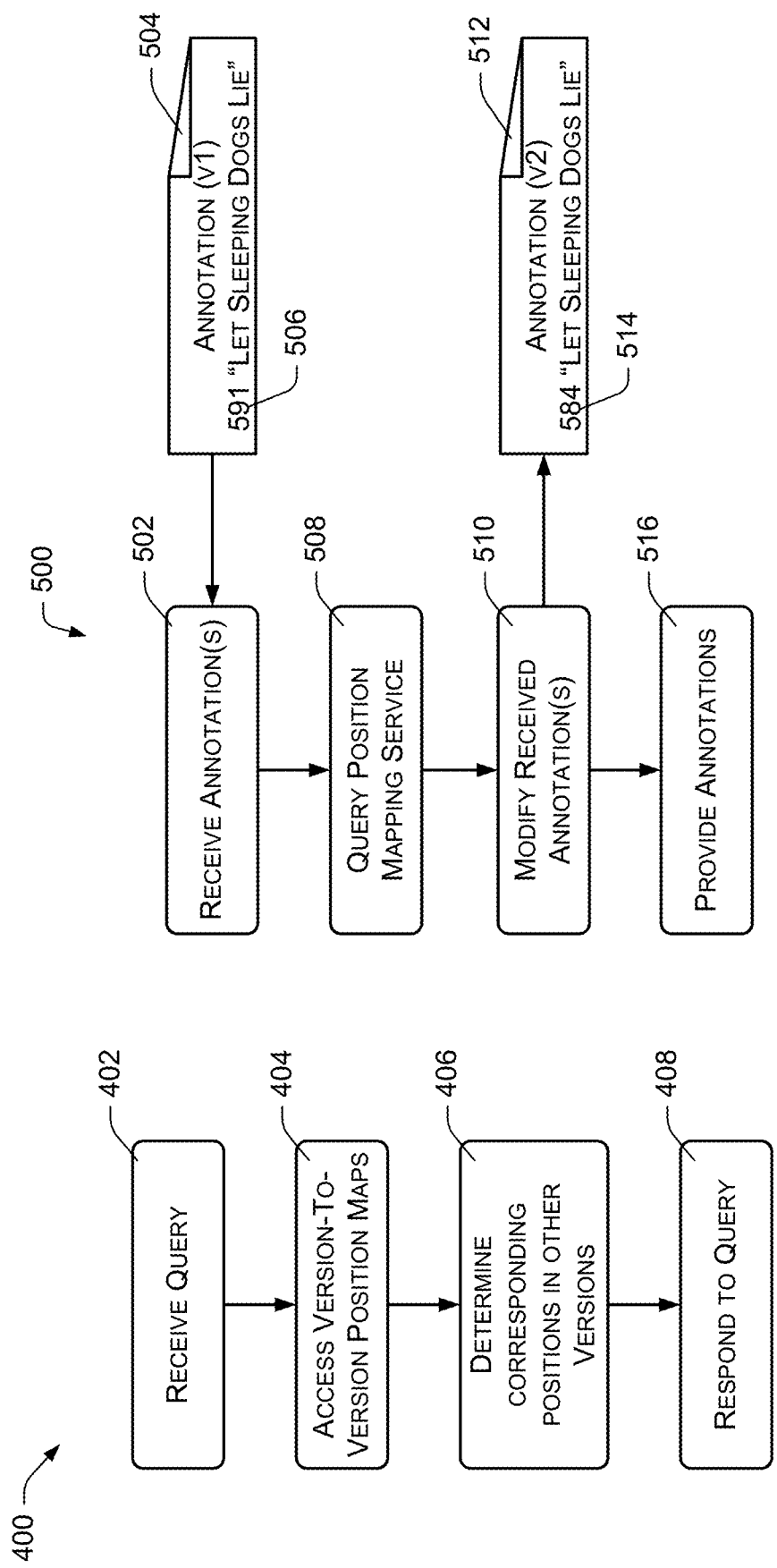

BOOK VERSION MAPPING

This is a continuation application which claims priority to commonly assigned, co-pending U.S. patent application Ser. No. 12/980,015, filed Dec. 28, 2010. Application Ser. No. 12/980,015 is fully incorporated herein by reference.

BACKGROUND

Locations within books have traditionally been indicated by page and line numbers. However, the concept of a "page" is not as meaningful in the context of electronic books, in which page divisions may be calculated dynamically, as a function of page and font size. Different book reader devices have different display sizes, and even within a particular device, a user may change viewing options to result in different effective page sizes.

Because of this, locations within electronic books are often specified in terms of an index that relates to a smaller unit of measure, such as by a byte/character index or a word index. For example, a particular word might be specified in terms of its starting and ending character indexes, relative to the beginning of the electronic book.

However, a further complication arises when dealing with multiple versions of an electronic book. When publishing electronically, revisions are very easy to implement, and publishers often submit new versions to correct relatively minor things such as typographical errors, as well as to make more significant revisions. More specifically, different versions may arise because of updates from the original publisher, because different publishers might submit versions of the same book, because of differences in electronic formats, because of differences in media (such as electronic vs. audio), and so forth.

Even small changes between versions can disrupt a position indexing scheme, making it difficult to correlate locations across versions.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 4 is a flow diagram of an illustrative process performed by a position mapping service.

FIG. 5 is a flow diagram illustrating the use of a position mapping service by an annotation mapping service.

DETAILED DESCRIPTION

This disclosure describes systems, devices, and techniques in which services that rely on content position can be used with different versions of an electronic book, even when the different versions use different indexing schemes or have revised content from one version to another. When providing position-dependent services or information, a position mapping service can be queried to obtain an equivalent position within a different version of an electronic book.

Example Architecture

Figure 1:
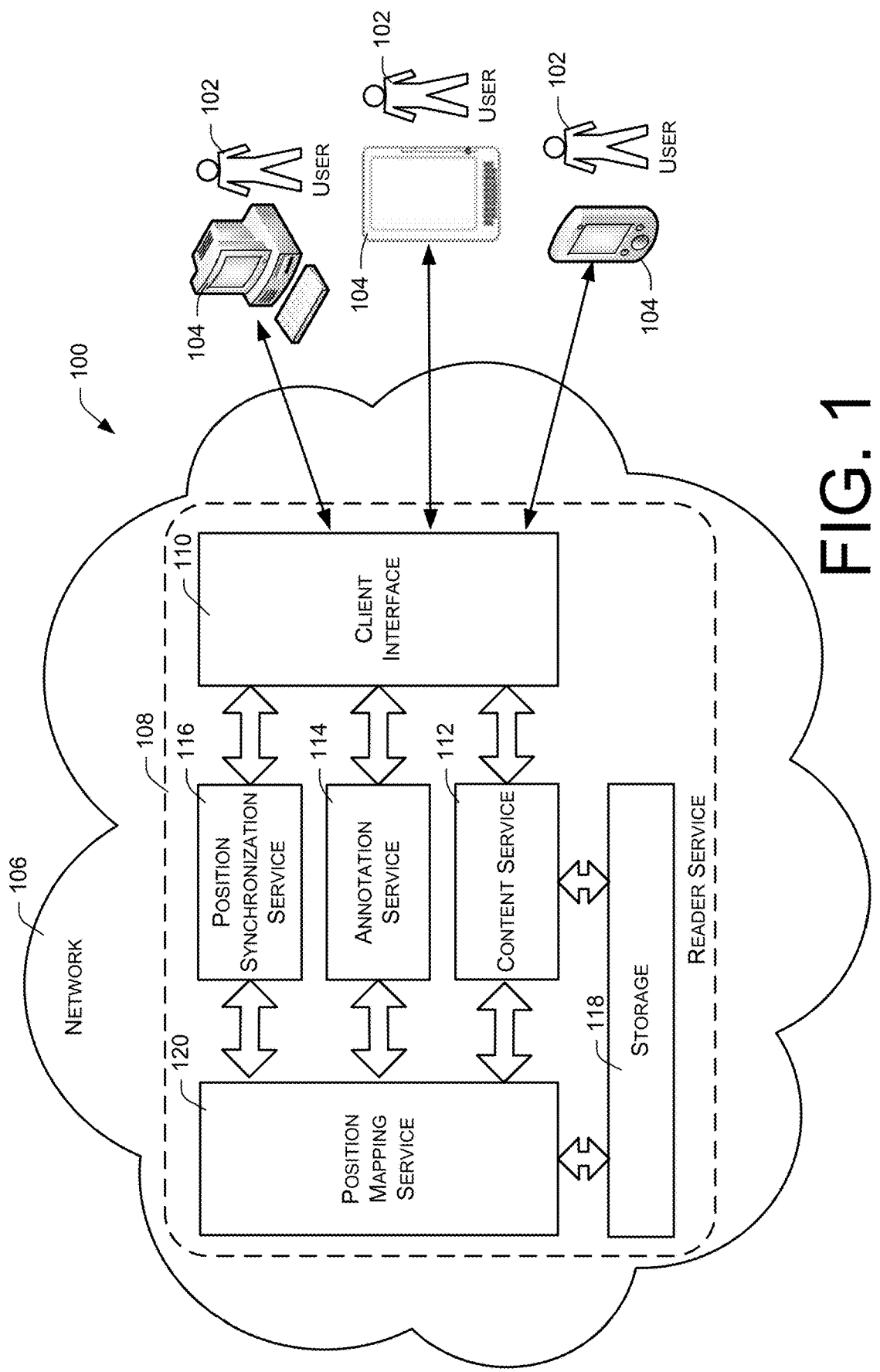
FIG. 1 is a block diagram illustrating a position mapping service and other services that might be used in conjunction with the position mapping service.

FIG. 1 shows an online environment 100 in which position-dependent services are provided. The online environment 100 includes a plurality of users 102, each of which has or is associated with an electronic book reader 104 (also referred to herein as an electronic reader). Although FIG. 1 illustrates three users 102 and book readers 104, the described techniques can of course be used with any number of users and electronic book readers. In addition, a single user 102 may use a plurality of electronic book readers 104.

Each electronic reader 104 has a display upon which electronic content such as electronic books (eBooks) may be rendered. The terms content, content item, and "eBook" include essentially any form of electronic data that may be consumed on a device, including textual and verbal works comprising sequences of words such as digital books, audio books, electronic magazines, papers, journals, periodicals, documents, instructional materials, course content, music, movies, and so on.

The electronic readers 104 may be handheld devices or other small, light-weight, portable devices upon which eBooks and other content can be rendered and conveniently viewed in a manner similar to viewing a paper book. Examples of handheld electronic readers include flat form-factor devices such as tablets, pads, smartphones, personal digital assistants (PDAs), etc. The electronic readers 104 may also comprise more traditional computing devices, such as desktop computers, laptop computers, and so forth.

In some embodiments, the electronic readers 104 may comprise dedicated-purpose eBook reader devices, having flat-panel displays and other characteristics that mimic the look, feel, and experience offered by paper-based books. For example, such eBook reader devices may have high-contrast flat-panel displays that appear similar to a printed page and that persist without frequent refreshing. Such displays may consume very negligible amounts of power, so that the eBook reader devices may be used for long periods without recharging or replacing batteries. In some instances, these readers may employ electrophoretic displays.

In the example of FIG. 1, the electronic readers 104 have networking capabilities. For example, the electronic readers 104 may have wireless communication interfaces that allow communication though a network 106. The wireless communications interfaces may utilize WiFi, cellular, or other wireless data and networking technologies.

The network 106 may be any type of communication network, including a local-area network, a wide-area network, the Internet, a wireless network, a wide-area network (WAN), a cable television network, a telephone network, a cellular communications network, combinations of the foregoing, etc. Services, sometimes referred to as "cloud-based" services, may be provided from the network 106. In FIG. 1, the network 106 is represented as a cloud, and network-based or cloud-based services relevant to this discussion are shown as blocks within the cloud.

In the described embodiment, the electronic readers 104 include nonvolatile storage capabilities so that electronic content items can be downloaded and stored in their entirety on the electronic readers. Once an eBook has been stored by an electronic reader, it can be displayed and read at any time, whether or not the electronic reader is connected to a network.

Each electronic reader 104 may be configured with account information corresponding to a particular user 102. Each user may have multiple electronic readers, which may synchronize with each other so that a user may stop reading on a first device and continue reading on a second device, at the same location that the user left off in the first device.

In the configuration illustrated by FIG. 1, the electronic readers 104 may obtain content items from an online reader service 108. The reader service 108 may be accessed using the networking capabilities of the electronic readers 104. The reader service 108 may be accessible through other means as well, such as by connection to intermediary devices like personal computers, different types of mobile devices, and so forth.

In FIG. 1, the reader service is illustrated as a network-based or cloud-based service, available over a public network such as the Internet. The electronic readers 104 may be configured to allow the users 102 to conveniently browse for content and content items from the reader service 108, and to purchase and download selected content items from the reader service 108.

Various applications and user interfaces may be used in conjunction with the electronic readers 104 to interact with the reader service 108, such as Internet browser programs that allow a user to interactively engage different online services. In addition, the reader service 108 may expose lower-level interfaces or APIs (application programming interfaces) through the network 106, through which devices and programs can access the underlying functionality of the reader service 108 without direct user interaction. For example a user may interactively purchase an eBook or other content item using a personal computer or some device other than the electronic reader device 104. The electronic reader 104 may periodically communicate with the reader service 108 to perform background synchronization or other housekeeping, and may automatically (without specific user intervention) download any content that has been purchased.

The reader service 108 might be implemented in some embodiments by an online merchant or vendor. Electronic books and other electronic content might be offered for sale by such an online merchant, or might be available to members or subscribers for some type of periodic or one-time fee. In some circumstances, eBooks or other content might be made available without charge.

FIG. 1 shows a configuration in which the reader service 108 is implemented as a number of functional components, illustrated as blocks within the larger dashed block representing reader service 108. These functional components, which will be described in more detail below, may be implemented and provided by way of a single installation and/or service provider, or may exist as independent services that communicate with each other using various means. Note that the illustrated configuration represents a logical organization of services, and is intended to facilitate description and explanation. However, the functionality and services represented in FIG. 1 may be implemented in many different ways, with various different divisions of responsibilities. Furthermore, some implementation may use different combinations of the described components, and some implementations may use only a subset of the described components and functionality.

The reader service 108 may in some embodiments include a client interface 110 through which electronic readers 104 and other clients interact with the reader service 108. The client interface 110 may include a virtual storefront or other type of online interface for interaction with consumers and/or devices. The client interface 110 may expose a graphical, web-based user interface that can be accessed by human users to browse and obtain (e.g., purchase, rent, lease, etc.) content items such as eBooks. The client interface may also expose programmatic interfaces or APIs that entities and devices can use to obtain digital content items and related services.

In the described embodiment, the reader service 108 provides one or more of the following services: a content service 112, an annotation service 114, and a position synchronization service 116. Clients such as electronic readers 104 may access or utilize these services through the client interface 110. The reader service 108 may also support additional services, which may also be accessible through client interface 110.

In addition, the reader service 108 provides and/or has access to support services, including storage 118 and a position mapping service 120. The storage 118 may include repositories, databases, cloud-based storage services, electronic memory, and other forms of computer-readable memory. The storage 118 may be utilized by the content service 112 as a content repository to store eBooks and other electronic content for consumption on the reader devices 104. The storage 118 may also be utilized by other services, including the annotation service 114, the position synchronization service 116, and the position mapping service 120.

The annotation service 114 can be accessed through the client interface 110 to provide various types of annotations services to users 102. Depending on the capabilities of the electronic readers 104, users may annotate different items of electronic content. Annotations may include highlights, underlining, comments, ratings, tags, corrections, and other items of information relating to specific locations within the electronic content. The annotations can be stored locally on the electronic readers, but may also be transmitted to the annotation service 114 of the reader service 108. User annotations might be archived by the reader service 108 for various reasons, such as for backup and sharing. For example, a user may at some point delete an annotated eBook from his or her electronic reader 104, and at some later time may re-obtain the same eBook from the reader service 108. Using the annotation service 114, the annotations may have been archived, and may be available for restoration when the user re-obtains the eBook or reloads the eBook onto his or her electronic reader 104. As another example, the annotation service 114 may implement annotation sharing, where annotations from one or more users are shared with one or more other users.

The position synchronization service 116 may be utilized when a user reads a content item on more than one electronic reader 104. For example, a user may begin reading a particular eBook on a first electronic reader, and then move to a second electronic reader to continue reading the same eBook. The position synchronization service 116 can be configured to receive updates from the first electronic reader regarding the last or furthest location accessed by the user within the eBook. When the user opens the same eBook on the second electronic reader, the second electronic reader may query the position synchronization service 116 for this information, and may then automatically navigate within the eBook to the last or furthest location in the eBook that was previously accessed from the first electronic reader.

The position mapping service 120 may be used by the annotation service 114 and the position synchronization service to cross-reference locations between different versions of electronic content. The operation and functionality of position mapping service 120 will be described in more detail below.

Position Mapping

The annotation service 114, the position synchronization service 116, and possibly other types of services deal with information that references particular positions within items of electronic content. Location or position within a particular content item can be indicated in different ways, and different eBook formats often use different metrics to indicate position. In paper-based books, location is usually indicated by page number, and possibly by a line number relative to a page. In eBooks, however, page boundaries are generally undefined, and page divisions vary based on the rendering capabilities and/or settings of the device upon which the eBooks are being rendered. Accordingly, some eBook formats may indicate position in terms of a character or byte index, such as the number of characters or bytes from the beginning of the eBook. Other eBook formats may indicate position in terms of a word index, such as the number of words from the beginning of the eBook. Other measurement quantities can also be used, such as a sentence index, a line index, or a paragraph index. In audio eBooks, location or position may be indicated by a time index—the length of elapsed time from the beginning of an audio eBook.

Other electronic formats may indicate location in more complex ways. For example, in electronic formats utilizing a markup language, location may be specified in terms of markup elements or with respect to unique markup identifiers within the content. For example, location might be specified as an offset from a particular unique identifier within the electronically formatted content. Similarly, in hierarchically arranged content, location might be specified in terms of nodes within the data structures representing the content.

For purposes of discussion, the various methods of indicating location, described above, will be referred to as indexing methods or metrics.

Different versions of a particular eBook can have discrepancies in location indexing, even within a single eBook format. In particular, the addition, deletion, or modification of words, characters, sentences, and paragraphs between versions of an eBook may result in the same word or passage having different position indexes within the respective versions. Furthermore, even versions having seemingly identical content may have differences in location indexing, due to arbitrary file structure differences that are invisible to end users.

The position mapping service 120 can be accessed by other services, such as by the annotation service 114 and the position synchronization service 116, to resolve location indexing discrepancies between different formats and versions. This allows the annotation service 114 and the position synchronization service 116 to correctly specify content positions to electronic readers 104, allowing for different eBook formats and different versions that might be in use on each particular electronic reader 104.

In particular, a component such as the annotation service 114 can submit a query to the position mapping service 120. The query may identify a particular content item, the version of the content item, and a position within the content item. The position mapping service 120 may respond by identifying a list of other versions of the same content item, and the positions within those versions corresponding to the specific position within the specified version/format.

Note that for purposes of explanation, the term "version" will be used herein to indicate a specific revision and eBook format of an electronic content item. Thus, two different "versions" of an electronic content item may vary from each other by content and/or by format. As an example, two different versions may be formatted using the same eBook format, but may have slightly different words or text. Alternatively, two different versions may have identical textual content, but may be formatted in two different eBook formats. For example, one version may be text-based, while another version may be audio-based. As another example, two different versions may comprise the same eBook in different languages.

Figure 2:
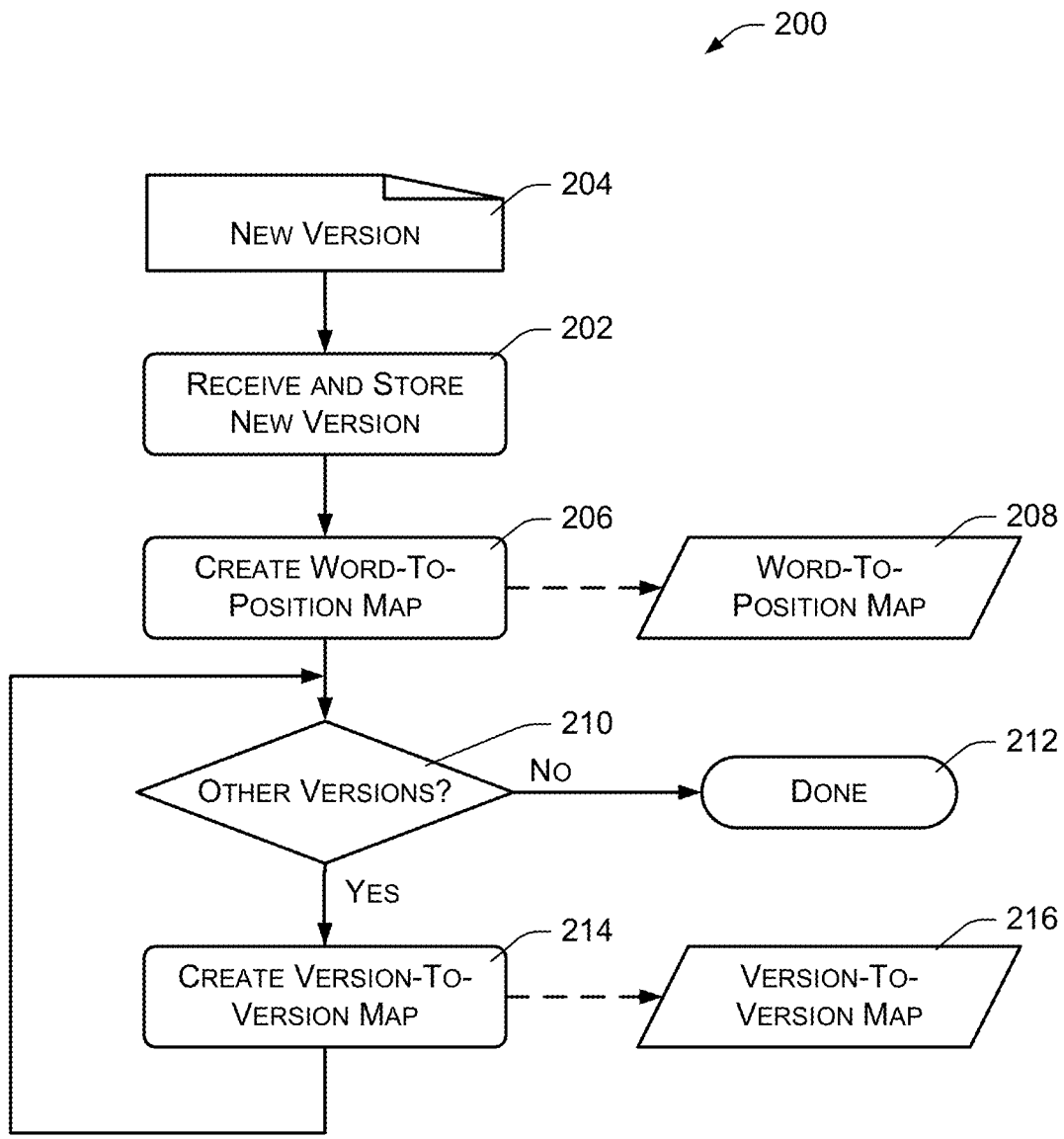
FIG. 2 is a flow diagram of an illustrative process of creating version-to-version position maps.

FIG. 2 shows an example procedure 200 performed by the position mapping service 120 to process incoming versions of various eBooks and to create resources that can be used in responding to position mapping queries. The procedure 200 may be executed as each new version is received by the reader service 108.

At 202, the reader service 108 receives a new version 204 of an electronic content item. The new version 204 may be submitted by an author or publisher, using existing procedures implemented by the reader service 108. The version 204 is stored by the reader service 108 in a content repository, which may be implemented using the storage 118.

The new version 204 may be an updated or modified version of an existing version of a content item. It may thus differ from one or more existing versions of the same content item in terms of content, storage format, or both. Content differences between two versions of the same work may range from very minor to relatively significant. For example, differences may consist of mere spelling corrections. More significant differences may involve significant editing or the addition/deletion of entire phrases, sentences, paragraphs, chapters, introductory materials, afterwards, etc. Versions may also differ in format. For example, one version might be formatted as a PDF (portable document format) document, while another is formed as a MOBI (Mobipocket) file. Versions may also vary by language or media. Thus, one version might be in a different language than another version. As another example, one version might comprise a written or text-based eBook, while another version might comprise an audio performance of the same eBook.

At 206, upon receiving the new version 204 of a content item, the position mapping service 120 indexes the words of the new version to indicate positions of words within the new version. More specifically, the position mapping service 120 creates a version-specific word-to-position map 208 corresponding to the new version 204. The word-to-position map 208 is a data object that lists renderable components of the version 204. Renderable components include words and other visual or audio entities such as photographs, tunes, sounds, glyphs, equations, symbols, graphics, charts, and so forth. White-space may be ignored, and omitted from the word-to-position map 208. Formatting characters and strings may also be ignored and omitted.

For each renderable component of the version 204, the word-to-position map 208 also indicates the position of that component relative to the entire version. Position is indicated in accordance with the protocol or format of the version 204, using the index metric specified by the protocol or format of the version 204. For example, some versions may use a format that indicates position by character or byte index, while other versions may use a format that indicates position by word index.

Figure 3:
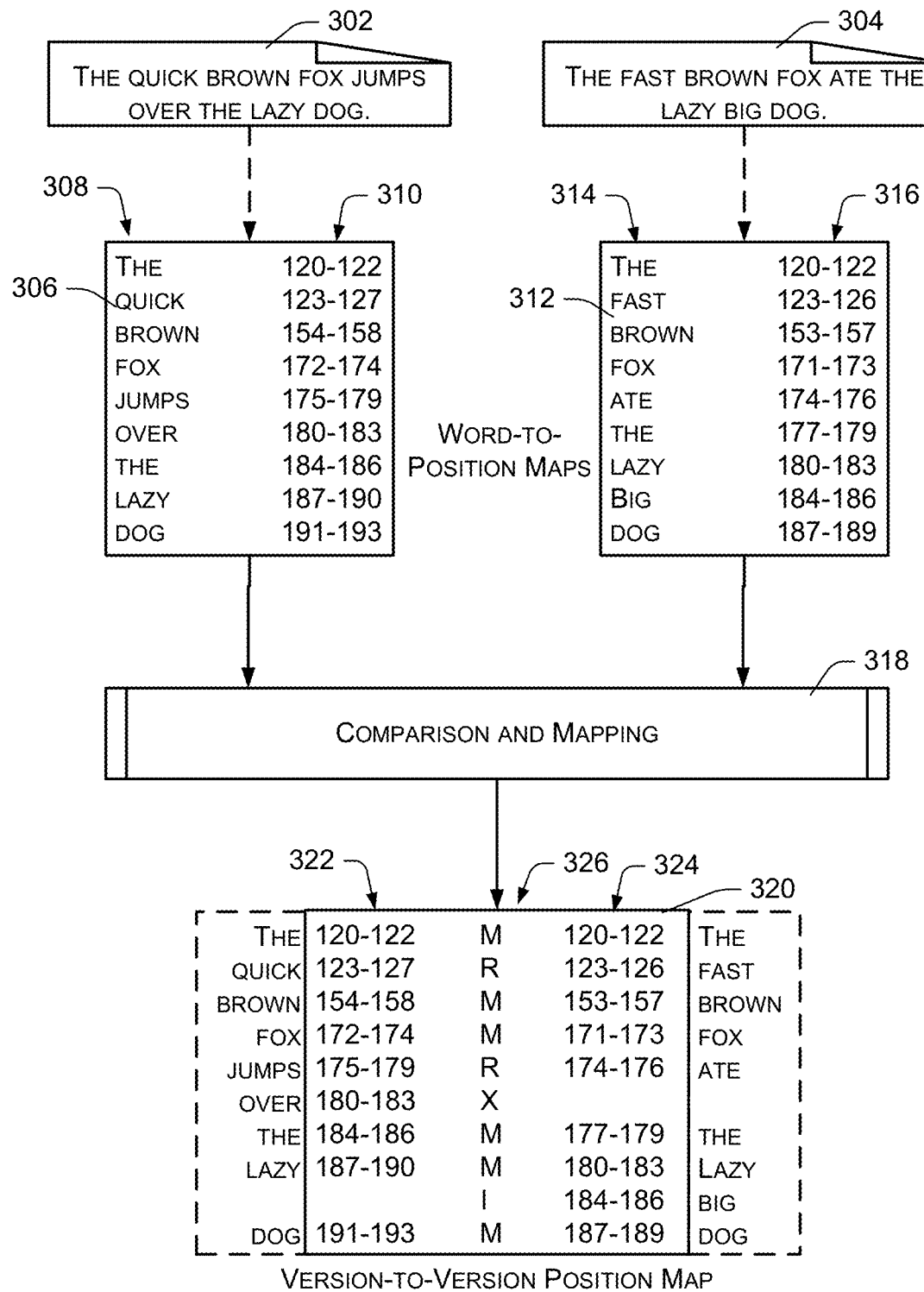
FIG. 3 is a block diagram illustrating relationships between content, version-specific word position maps, and version-to-version position maps.

FIG. 3 shows examples of word-to-position maps corresponding to fragments of two different electronic content versions—a version 302 and a version 304. The two versions comprise a sentence that has been changed between versions. In version 302, the sentence is "The quick brown fox jumps over the lazy dog." In version 304, the sentence has been revised to "The fast brown fox ate the lazy big dog."

Below version 302 is a corresponding word-to-position map 306. It has a first column 308 that lists the words occurring in version 302. It has a second column 310 that indicates the position of each word. Position is indicated in this example by starting and ending character indexes. Note that the positions may in some cases be discontinuous due to non-renderable characters that have been ignored.

Below version 304 is a corresponding word-to-position map 312. It has a first column 314 that lists the words occurring in version 304. It has a second column 316 that indicates the position within version 304 of every word. Again, position is indicated by starting and ending character indexes.

Returning to FIG. 2, block 210 represents determining whether there are any other versions corresponding to the received new version 204: whether there are any other existing versions of the same content item. If there are not, the procedure ends, as indicated at 212. If there is at least one other version, the position mapping service 120 performs an action 214, which comprises comparing different versions to find word correlations. More specifically, action 214 comprises creating a version-to-version position map 216 based on the indexing described above with reference to block 206, and based on comparing different versions to find word correlations. The version-to-version position map 216 indicates corresponding word positions within the different versions. More specifically, the version-to-version position map 216 indicates, for any position within version 204, the corresponding position within another version. The positions are indicated in accordance with the formats of the respective versions. Thus, word positions in the version 204 may be indicated using a first index metric, while word positions in the other version may be indicated by a second index metric. If version 204, for example, represents position by character index, the version-to-version position map 216 indicates positions of version 204 by character index. If the other version represents position by word index, the version-to-version position map 216 indicates positions within the other version by word index. As another example, a version-to-version position map may indicate positions in a text version of an eBook using a text index and may indicate positions in an audio version using a time index.

FIG. 3 illustrates the creation and a possible format of a version-to-version position map. The word-to-position maps 306 and 312 are provided to a comparison and mapping module or program 318 for comparison against each other. Module 318 compares the word sequences of the two versions 302 and 304, and produces a version-to-version position map 320. The comparison and mapping module 318 may be implemented as described in a US Provisional Application entitled "Aligning Content Items to Identify Differences", by inventors Hamaker and Killalea, having Ser. No. 61/427,682_, filed_Dec. 28, 2010_, which is hereby incorporated by reference.

Within the version-to-version position map 320, the positions of words in version 302 are indicated in a left column 322. The positions of corresponding words in version 304 are indicated in a right column 324.

A middle column indicates change metadata, such as correspondence types between the left and right columns. In this example, an "R" indicates that one word has been replaced by another (such as "quick" being replaced by "fast"). An "X" indicates that the word has been deleted from the version 304. An "I" indicates that version 304 contains an inserted or new word. An "M" indicates that there was a match—that the word of the version 302 was matched with a word from the version 304. For words that are simply deleted, the right column 324 is blank. For words that are inserted, the left column 322 is blank.

In some implementations, additional change metadata might be included. In particular, each type of change metadata described above might be accompanied by a confidence factor ("CF"), indicating the confidence with which the determination was made. This indicator might be used for various purposes. For example, if a match or "M" entry has a relatively low CF, human-based analysis might be performed to confirm the match.

For purposes of illustration, FIG. 3 also shows the original words to the left and right of the version-to-version position map 320. The words may or may not be included in the actual version-to-version position map. Note that the version-to-version position map 320 may be formatted in various different ways.

Returning again to FIG. 2, actions 210 and 214 iterate as long as there is another version to which the new version 204 can be compared. When the new version 204 has been compared to all other versions, the procedure ends at 212.

The process of FIG. 2 can be performed for all existing versions of works maintained by the content service 112. In addition, it can be automatically invoked upon receiving or accepting any new content. This allows new content to be automatically processed and cross-referenced to existing content.

FIG. 4 shows an example procedure 400 performed by the position mapping service 120 to provide position mapping services to requesting clients and processes, such as the annotation service 114 and the position synchronization service 116. At 402, the position mapping service 120 receives a position query that specifies a first version of an electronic book and a particular position within that version. In addition, the query specifies a second version of the electronic book, within which the specified location is being sought. Within the query, the position is specified relative to the first version, using an index metric that is compatible with the format of the first version. For example, the position might be specified as a character index.

At 404, the position mapping service 120 locates and accesses a version-to-version position map that corresponds to the first and second specified versions. In particular, the mapping service 120 accesses a version-to-version position map that translates or maps word positions from the first version to the second version. This version-to-version position map may be one of numerous maps that are generated in the procedure 200 of FIG. 2. Alternatively, version-to-version position maps may be generated dynamically, on demand.

At 406, the position mapping service uses the appropriate version-to-version position map to find or determine the position in the second version that corresponds to the specified position in the first version. When using a format such as that shown in FIG. 3, this involves a simple look-up procedure: the specified position is found in the first column 322, and the corresponding position is found in the second column 324.

At 408, the position mapping service responds to the query by returning the position in the second version that corresponds to the specified position in the first version. The position mapping service may also return any available change metadata, which may comprise a CF indicating the nature of the correspondence indicated by the mapping and the confidence with which the mapping was obtained.

Position-Based Annotation Services

FIG. 5 shows an example 500 of how an external client or component, such as the annotation service 114, may utilize the position mapping service 120. At 502, the annotation service 114 receives an annotation or a plurality of annotations. For example, the annotations may be submitted from an electronic reader 104 through the client interface 110. An example of an annotation is shown in FIG. 5, designated by reference numeral 504. Annotation 504 includes a position indicator 506, which indicates a position index of "591" relative to a first or source version of an electronic book.

The annotation 504 may be in various formats, and may indicate a variety of information. For example, the annotation may indicate a comment as shown: "Let sleeping dogs lie." Alternatively, the annotation may indicate some type of action or characteristic, such as a highlight. In addition, the annotation 506 indicates a word position or a range of word positions. The annotation may also indicate the version number of a particular electronic book to which the annotation applies.

At 508, the annotation service 114 submits one or more queries to the position mapping service 120. Each query may specify an electronic book, a particular version of that book, a position within that version, and a target version to which the specified position is to be mapped. The position mapping service 120 responds as described above with reference to FIG. 4, by accessing its version-to-version positions maps and returning the corresponding position within the target version. The annotation service may submit queries for every annotation, or may submit a single query that specifies multiple annotations.

At 510, the annotation servicer 114 associates the received annotations with their corresponding positions within the target version of the electronic book. In some embodiments, the original annotations can be modified by replacing the original position indicator with a new position indicator, specifying position in terms of the target version. FIG. 5, for example shows a modified annotation 512 that corresponds to the submitted annotation 504. In the modified annotation 512, a position indicator 514 now indicates a position index of "584," indicating that the word at position 591 in the original version is at position 584 in the target version. In other embodiments, a new version of the annotation may be created, specifying the new position indicator.

As mentioned, annotations may be formatted in various ways. As one example, a single annotation might be modified to include position indicators for two or more different versions. Thus, rather than replacing the position indicator of an annotation, a second position identifier might be added.

The annotation service 114 may use received annotations in various ways at 516. In some embodiments, annotations may be archived for users of electronic readers. Archived annotations may be restored to the electronic readers from which they were received, or may be restored to other electronic readers. In some situations, the electronic book to which the annotations pertain may exist on a new electronic reader in a version different than the version in which the annotations were originally made. In other situations, the electronic book reader may utilize a different eBook format. The annotation service 114, as described above, may modify the annotations or create new annotations, so that they correspond to the version and format in use on the reader to which the annotations are being supplied.

Annotations received from a particular electronic reader may also be shared with different electronic readers, including readers belonging to other users. Annotations may be received from a plurality of users and electronic readers, and shared collectively with the same users and electronic readers and/or with additional users and electronic readers. The annotation service may also compile statistics or other indirect information from received annotations, and may utilize such information in various ways such as by indicating popular annotations to users who desire to see them.

Position Synchronization Services

Figure 6:
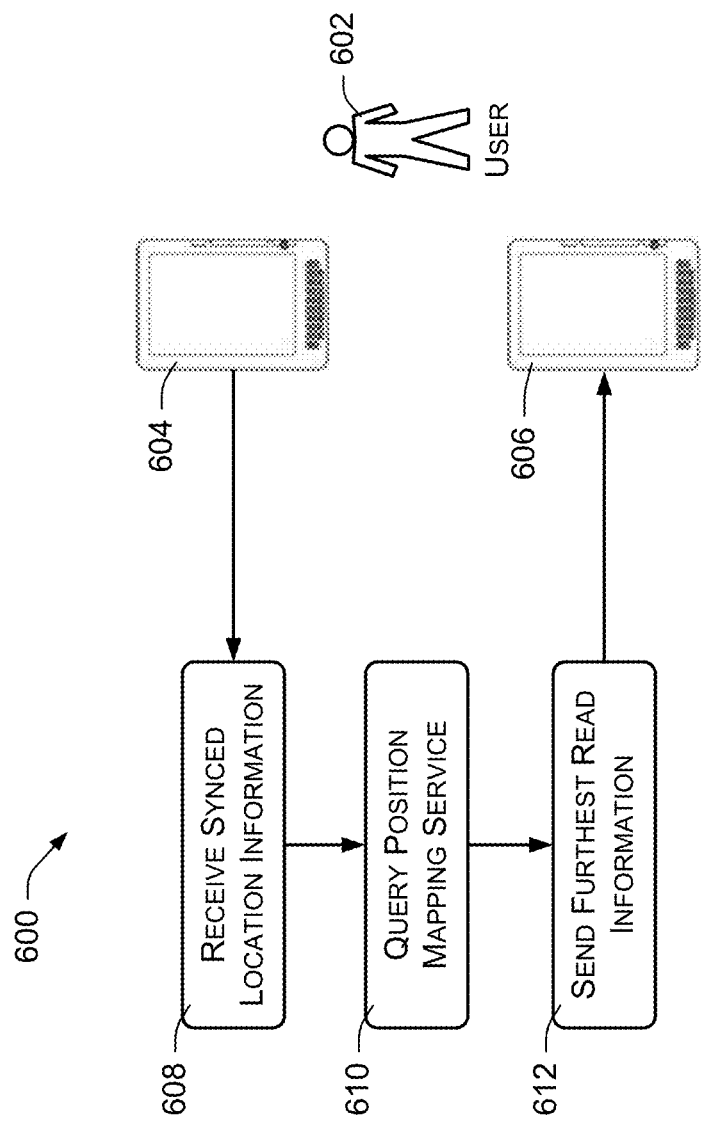
FIG. 6 is a flow diagram illustrating the use of a position mapping service by a position synchronization service.

FIG. 6 shows an example 600 of how the position synchronization service 116 may utilize the position mapping service 120. This example assumes that a user 602 has two different electronic readers, 604 and 606. The user initially reads an electronic book on reader 604, and at some point switches to reader 604 and continues reading at the furthest-read or last-accessed position in the same electronic book. This situation may arise when the user has different devices that are used in different situations. For example, the first electronic reader 604 may be a dedicated reader device that the user keeps at home. The second electronic reader 606 may be a mobile communications device such as a smartphone. The user may read using the first reader 604 in some situations, but switch to the electronic reader 606 in other situations, such as perhaps when taking the subway home from work.

At 608, the position synchronization service 116 receives synchronization information from the first electronic reader 604. The synchronization may include various information, including a position indicator corresponding to the furthest or most recent position accessed by the user 602 when reading a particular version of an electronic book using the electronic reader 604. The position indicator uses the indexing method of the first electronic reader 604 and specifies position in terms of the version of the electronic book that is being used on the first electronic reader 604.

Assuming that the second electronic reader 606 has a different version of the electronic book, at 610 the position synchronization service 116 queries the position mapping service 120 to find the position within the second version that corresponds to the last-accessed position in the first version. At 612, this information is sent or provided to the second electronic reader 606. The second electronic reader 606 may then navigate based on this information, and the user can resume reading at the synchronized location.

Example Electronic Reader

Figure 7:
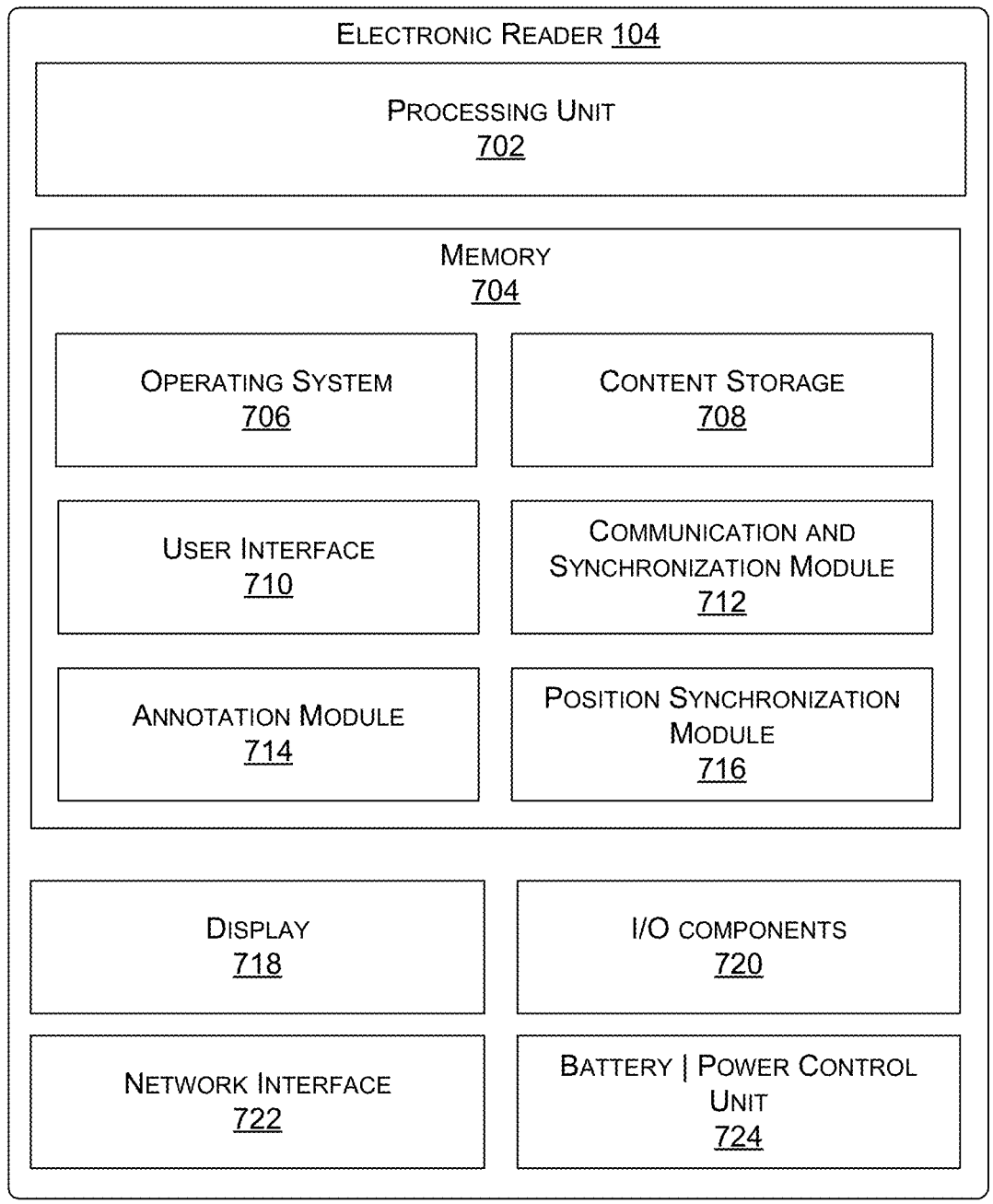
FIG. 7 is a block diagram illustrating components of an electronic book reader device that may be used in conjunction with the techniques described herein.

FIG. 7 is a high-level block diagram showing an example of the electronic reader 104, indicating components that are relevant to this discussion. In this embodiment, the electronic reader 104 is a dedicated eBook reader device, designed specifically for the purpose of emulating a traditional book-like reading experience. To that end, it is has a size and weight that is comparable to a paper-based book, and uses a monochrome display having a contrast ratio that approaches that of the printed page.

In a very basic configuration, the electronic reader 104 includes a processing unit 702 composed of one or more processors, and memory 704. Depending on the configuration of the eBook reader 104, the memory 704 may be a type of computer storage media and may include volatile and nonvolatile memory. Thus, the memory 704 may include, but is not limited to, RAM, ROM, EEPROM, flash memory, or other memory technology, or any other medium which can be used to store media items or applications and data which can be accessed by the electronic reader 104.

The memory 704 may be used to store any number of functional components that are executable on the processing unit 702. In many embodiments, these functional components comprise instructions or programs that are executable by the processing unit 702, and that implement operational logic for performing the actions attributed above to the electronic reader 104. In addition, the memory 704 may store various types of data that are referenced by executable programs.

The memory 704 may store an operating system 706 and content storage 708 to store one or more content items. A user interface module 710 may also be provided in the memory 704 and executed on the processing unit 702 to provide for user operation of the electronic reader 104. The UI module 710 may provide menus and other navigational tools to facilitate selection and rendering of content items. The UI module 710 may further include a browser or other application that facilitates access to sites over a network, such as websites or online merchants, or other sources of electronic content items or other products.

A communication and synchronization module 712 is stored in the memory 704 and executed on the processing unit 702 to perform management functions in conjunction with one or more content sources, such as the content service 108 discussed above. In some embodiments, the communication and synchronization module 712 communicates with the content service 108 to receive eBooks and other content items.

The electronic reader 104 may also include an annotation module 714 allowing a user to enter annotations and to communicate annotations with the annotation service 114, in accordance with the techniques described above. Similarly, the electronic reader 104 may include a position synchronization module 716 that communications with the position synchronization service 116 as described above, to synchronize last-read positions between different electronic readers.

The electronic reader 104 may further include a display 718 upon which electronic books are rendered. In one implementation, the display 718 uses electronic paper display technology. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some exemplary electronic paper displays that may be used with the implementations described herein include bi-stable LCDs, MEMS, cholesteric, pigmented electrophoretic, and others. One exemplary electronic paper display that may be used is an E Ink-brand display. Touch sensitive technology may be overlaid or integrated with the electronic paper display technology to enable user input via contact or proximity to the screen.

The electronic reader 104 may further be equipped with various input/output (I/O) components 720. Such components may include various user interface controls (e.g., buttons, joystick, keyboard, etc.), audio speaker, connection ports, and so forth.

A network interface 722 may support both wired and wireless connection to various networks, such as cellular networks, radio, WiFi networks, short range networks (e.g., Bluetooth), IR, and so forth. The network interface 722 facilitates receiving electronic books and other content as described herein.

The electronic reader 104 may also include a battery and power control unit 724. The power control unit operatively controls an amount of power, or electrical energy, consumed by the electronic reader. Actively controlling the amount of power consumed by the electronic reader may achieve more efficient use of electrical energy stored by the battery.

The electronic reader 104 may have additional features or functionality. For example, the electronic reader 104 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Example Server

Figure 8:
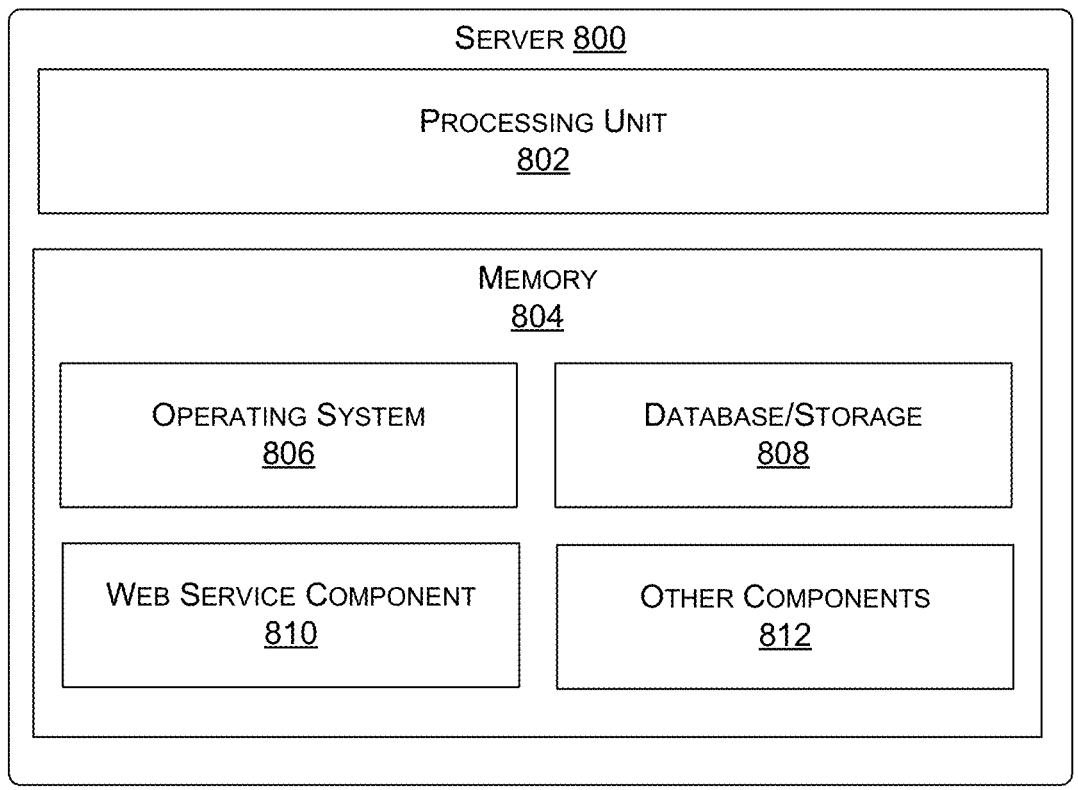
FIG. 8 is a block diagram illustrating components of a server that may be used to implement some of the techniques described herein.

FIG. 8 illustrates relevant components of a server 800 that may be used to implement the functionality of the content service 108 and/or its various components. Generally, the content service 108 and its services may be implemented by one or more servers, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises.

In a very basic configuration, an example server 800 may comprise a processing unit 802 composed of one or more processors, and memory 804. Depending on the configuration of the server 800, the memory 804 may be a type of computer storage media and may include volatile and non-volatile memory. Thus, the memory 804 may include, but is not limited to, RAM, ROM, EEPROM, flash memory, or other memory technology.

The memory 804 may be used to store any number of functional components that are executable by the processing unit 802. In many embodiments, these functional components comprise instructions or programs that are executable by the processing unit 802, and that when executed implement operational logic for performing the actions attributed above to the content service 108. In addition, the memory 804 may store various types of data that are referenced by executable programs, including content items that are supplied to consuming devices such as electronic reader 104.

Functional components stored in the memory 804 may include an operating system 806 and a database 808 to store content items, annotations, maps, etc. Functional components of the server 800 may also comprise a web service component 810 that interacts with remote devices such as computers and media consumption devices.

The server 800 may of course include many other logical, programmatic, and physical components, generally referenced by numeral 812, of which those described above are merely examples that are related to the discussion herein.

CONCLUSION

Note that the various techniques described above are assumed in the given examples to be implemented in the general context of computer-executable instructions or software, such as program modules, executed by one or more computers or other devices. Generally, program modules include routines, programs, objects, components, data structures, etc. for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

The invention claimed is:

1. A computer-implemented method comprising:
  under control of one or more servers configured with executable instructions,
  receiving a first version of an electronic book at the one or more servers;
  indexing words of the first version of the electronic book to create a first index indicating positions of the words within the first version;
  determining that there is a second version of the electronic book available from the one or more servers;
  indexing words of the second version of the electronic book to create a second index indicating positions of the words within the second version;
  generating a position map based on a comparison between the first index and the second index;
  receiving an annotation from an electronic book reader, wherein the annotation specifies a version number of the electronic book and a first position within the first version of the electronic book;
  determining a second position, based on the position map, within the second version of the electronic book that corresponds to the first position within the first version of the electronic book;
  associating the annotation with the second position within the second version of the electronic book; and
  transferring the annotation to the electronic book reader or to one or more other electronic book readers having the first version of the electronic book and/or the second version of the electronic book.

2. The computer-implemented method of claim 1, wherein each of the first and second versions comprises a sequence of words, and the position map includes metadata indicating correspondence types for corresponding word positions;
  wherein the determining the second position within the second version of the electronic book that correspond to the first position within the first version of the electronic book comprises referencing the position map.

3. The computer implemented method of claim 2, wherein the metadata comprises at least one of:
  words that have been inserted in the second version and have no corresponding words in the first version; or
  words that have been deleted in the second version and not deleted from the first version.

4. The computer-implemented method of claim 1, wherein each of the first and second versions comprises a sequence of words, and the position map includes metadata indicating confidence factors for corresponding word positions;
  wherein the determining the second position within the second version of the electronic book that correspond to the first position within the first version of the electronic book comprises referencing the position map.

5. The computer-implemented method of claim 1, further comprising identifying one or more particular annotations that are included in at least a number of the annotations as being popular annotations.

6. The computer implemented method of claim 1, wherein the first version of the electronic book is in a first format and the second version of the electronic book is in a second format, the first format being different than the second format.

7. A computer-implemented method comprising:
  under control of one or more servers configured with executable instructions,
  receiving a first version of an electronic book at the one or more servers;
  indexing words of the first version of the electronic book to create a first index indicating positions of the words within the first version;
  determining that there is a second version of the electronic book available from the one or more servers;
  indexing words of the second version of the electronic book to create a second index indicating positions of the words within the second version;
  generating a position map based on a comparison between the first index and the second index;
  receiving an annotation from an electronic book reader, wherein the annotation specifies a version number of the electronic book and a first position within the first version of the electronic book;
  identifying a second position within the second version of the electronic book that corresponds to the first position within the first version of the electronic book;
  associating the annotation with the second position within the second version of the electronic book; and
  sending the annotation to the electronic book reader or one or more other electronic book readers having the first version of the electronic book and/or the second version of the electronic book.

8. The computer-implemented method of claim 7, wherein each of the first and second versions comprises a sequence of words, and the position map includes metadata indicating correspondence types for corresponding word positions;
  wherein identifying the second position within the second version of the electronic book that correspond to the first position within the first version of the electronic book comprises referencing the position map.

9. The computer-implemented method of claim 7, wherein each of the first and second versions comprises a sequence of words, and the position map includes metadata indicating confidence factors for corresponding word positions;
  wherein identifying the second position within the second version of the electronic book that correspond to the first position within the first version of the electronic book comprises referencing the position map.

10. The computer-implemented method of claim 7, further comprising identifying one or more particular annotations that are included in at least a number of the annotations as being popular annotations.

11. The computer-implemented method of claim 7, wherein the first version of the electronic book is in a first format and the second version of the electronic book is in a second format, the first format being different than the second format.

12. A system comprising:
one or more processors; and
memory storing instructions that, when executed by the one or more processors, configure the one or more processors to perform operations comprising:
receiving a first version of an electronic book at the one or more processors;
indexing words of the first version of the electronic book to create a first index indicating positions of the words within the first version;
determining that there is a second version of the electronic book available at the one or more processors;
indexing words of the second version of the electronic book to create a second index indicating positions of the words within the second version;
generating a position map based on a comparison between the first index and the second index;
receiving an annotation from an electronic book reader, wherein the annotation specifies a version number of the electronic book and a first position within the first version of the electronic book;
determining a second position, based on the position map, within the second version of the electronic book that corresponds to the first position within the first version of the electronic book;
associating the annotation with the second position within the second version of the electronic book; and
transferring the annotation to the electronic book reader or one or more other electronic book readers having the first version of the electronic book and/or the second version of the electronic book.

13. The system of claim 12, the operations further comprising:
comparing the first index to the second index; and
determining, based at least in part on the comparing, metadata representing one or more differences between one or more corresponding words of the first version and the second version.

14. The system of claim 13, wherein the position map is generated based on the metadata.

15. The system of claim 13, wherein the metadata comprises at least one of:
an indication of words in the second version that have no corresponding words in the first version; or
an indication of words that have been deleted in the second version and not deleted from the first version.

16. The system of claim 13, wherein the metadata identifies words in the first version that have been at least one of: inserted, deleted, or replaced in the second version with different words.

17. The system of claim 13, wherein the metadata indicates types of correspondences between the one or more corresponding words of the first version and the second version.

18. The system of claim 12, wherein the position map includes a confidence factor for one or more of the first position or the second position of corresponding words indicating a level of confidence with which the determined first position or the second position.

19. The system of claim 12, wherein the position map indicates:
word positions in the first version using a first index metric; and
corresponding word positions in the second version using a second index metric.

20. The system of claim 12, wherein the position map further indicates:
positions in the first version using a text index; and
positions in the second version using a time index.

* * * * *